United States Patent [19]

Tsuji et al.

[11] Patent Number: 5,181,668
[45] Date of Patent: Jan. 26, 1993

[54] APPARATUS FOR RUNNING A WIRE THROUGH A PIPE

[75] Inventors: Toshinori Tsuji; Koichi Hosoya; Fumio Tsukimoto; Tatsuya Ashida, all of Osaka; Katsuyuki Okubo, Sakai; Tetsuo Bokuhara; Toshiaki Shinzo, both of Osaka, all of Japan

[73] Assignees: Osaka Gas Co., Ltd.; Togawa Rubber Co., Ltd., both of Osaka, Japan

[21] Appl. No.: 590,591

[22] Filed: Sep. 26, 1990

Related U.S. Application Data

[62] Division of Ser. No. 253,258, Oct. 4, 1988, abandoned.

[51] Int. Cl.$^5$ .............................................. B65H 75/00
[52] U.S. Cl. ........................... 242/54 R; 15/104.33; 118/317; 118/DIG. 10; 264/269; 267/167
[58] Field of Search .............. 15/104.33, 104.05; 29/173; 264/267, 269, 270, 516, 36; 118/DIG. 10, DIG. 13, 317; 138/97; 156/287, 293, 294; 267/167, 170, 180; 226/49, 121, 143; 242/54 R, 77

[56] References Cited

U.S. PATENT DOCUMENTS

| 1,629,292 | 5/1927 | Newsom | 264/269 |
|---|---|---|---|
| 2,293,365 | 8/1942 | Scott | 264/269 |
| 2,377,615 | 6/1945 | Crane | 264/269 |
| 2,608,501 | 8/1952 | Kimble | 264/269 |
| 2,637,866 | 5/1953 | Kiesler, Jr. | 15/104.33 |
| 2,953,799 | 9/1960 | Arnold | 15/104.33 |
| 3,112,227 | 11/1963 | Curtis | 118/DIG. 10 |
| 3,211,574 | 10/1965 | Shannon | 138/97 |
| 4,080,706 | 3/1978 | Heilman et al. | 128/772 |
| 4,153,966 | 5/1979 | Irwinn . | |
| 4,252,763 | 2/1981 | Padgett | 264/269 |
| 4,377,984 | 3/1983 | Donnelly | 118/DIG. 10 |
| 4,456,073 | 6/1984 | Barth et al. | 405/195.1 |
| 4,534,418 | 8/1985 | Hegemann et al. | 172/708 |
| 4,570,281 | 2/1986 | Boelens | 15/104.33 |
| 4,617,693 | 10/1986 | Meyer et al. | 15/104.33 |
| 4,735,168 | 4/1988 | Attwell | 118/DIG. 10 |
| 4,854,032 | 8/1989 | Dambre | 156/124 |

FOREIGN PATENT DOCUMENTS

| 282588 | 9/1988 | European Pat. Off. . | |
|---|---|---|---|
| 1935805 | 2/1966 | Fed. Rep. of Germany . | |
| 2305315 | 3/1975 | France . | |
| 2517222 | 11/1982 | France . | |
| 336860 | 2/1936 | Italy | 264/270 |
| 61-176912 | 11/1986 | Japan . | |
| 62-156926 | 7/1987 | Japan | 156/293 |

OTHER PUBLICATIONS

German Publication DIW-2090, Jan. 1971.

*Primary Examiner*—Jeffery Thurlow
*Assistant Examiner*—Mathieu Vargot
*Attorney, Agent, or Firm*—Gifford, Groh, Sprinkle, Patmore and Anderson

[57] ABSTRACT

An apparatus for inserting a coil of wire into a pipe which includes a rotatable drum for taking up a coil of spring wire, a guide for guiding the coil drawn from the rotatable drum, a push-pull device for applying external forces to the coil for feeding the coil into the pipe and retracting the coil out of the pipe, and a motor for rotating the guide and/or the drum. The drum and the guide are formed separately and are rotatable independently of each other, which rotation results in rotation of the coil of spring wire. The coil of wire has a rectangular or trapezoidal cross-section which enables the wire to effectively run through bends in the pipe without deforming or breaking.

6 Claims, 10 Drawing Sheets

APPARATUS FOR RUNNING A WIRE THROUGH A PIPE

This is a divisional of copending application Ser. No. 07/253,258 filed on Oct. 4, 1988, now abandoned.

BACKGROUND OF THE INVENTION (1) Field of the Invention

The present invention relates to a method of inserting a wire into a pipe, a method of lining inside walls of a pipe, and an apparatus for running a wire through a pipe. More particularly, the invention relates to a method of inserting a wire into a pipe, comprising the steps of feeding a coil spring wire into a pipe while rotating the wire in a first direction, and thereafter retracting the wire out of the pipe while rotating the wire in a second direction opposite to the first direction, a driving force resulting from the rotation of the coil spring wire being applied to the wire in directions of movement thereof at a position where the coil spring wire is caught by the pipe both when the wire is fed into the pipe and when the wire is retracted out of the pipe. The present invention relates also to a method of lining inside walls of a pipe, which utilizes the foregoing method, and to an apparatus for inserting a wire into a pipe, which is used for executing these methods.

(2) Description of the Prior Art

Figure 16:
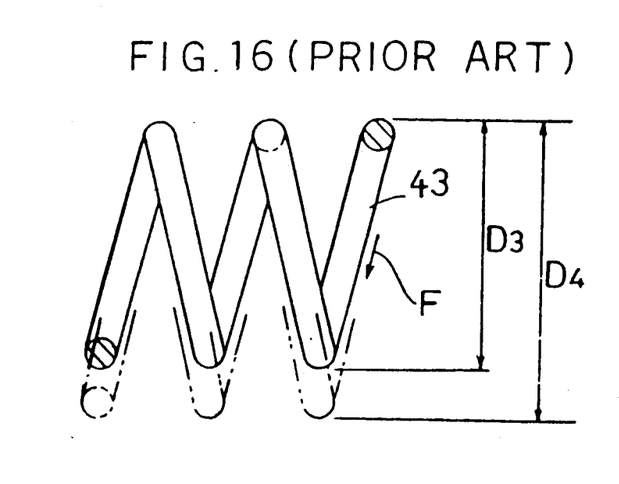
FIG. 16 is an explanatory view of a wire in the form of a coil spring according to the prior art.

The known method noted above for inserting a wire into a pipe employs a wire in the form of a coil spring having a circular cross section as shown in FIG. 16.

When the coil spring wire 43 is advanced through the pipe or retracted from the pipe, an external force F resulting from the rotational resistance of lining bodies and the coil spring wire 43 rotates the wire 43 in an unwinding direction to increase the coil diameter of the wire 43 from D3 to D4 as illustrated. In order to overcome this situation, the wire diameter may be increased or the coil spring wire 43 may be formed of a strong material for increased wire strength. But then the wire 43 will become less flexible, which impairs wire feeding into the pipe because of the presence of bent pipe parts. Conversely, where the coil spring wire 43 has increased flexibility, the wire 43 will become crumpled into a zigzag shape due to the external force F, and unable to rotate due to frictional contacts with the pipe. This situation makes the wire running impossible, and tends to deform and/or break the coil spring wire 43. Thus, the known method has room for improvement.

Where the above known method is used for lining inside walls of a pipe, satisfactory results cannot be obtained because of the difficulties encountered in running the wire through the pipe as noted.

The known apparatus for inserting a wire into a pipe has the problem of developing zigzagging and kinks of the wire when advancing or retracting the wire, in addition to the drawback relating to the use of the coil spring wire as noted above. The known apparatus is vulnerable to trouble particularly when inserting a wire into a pipe including many bent positions.

SUMMARY OF THE INVENTION

Having regard to the state of the art noted above, a primary object of the present invention is to provide a method of inserting a wire into a pipe which allows a flexible coil spring wire to be fed in rotation into the pipe reliably, and is capable of effectively preventing deformation and/or breakage of the wire.

Another object of the invention is to provide a method of lining inside walls of a pipe which is capable of internally lining even a pipe having many bent positions easily and reliably, and which allows a lining material to be fed under high pressure into the pipe without deforming and/or breaking the coil spring wire and without blocking a hose used for feeding the lining material.

A further object of the invention is to provide an apparatus for inserting a wire into a pipe which allows the wire to be fed into the pipe and inside walls of the pipe to be lined reliably.

In order to achieve the primary object above, a method of inserting a wire into a pipe, according to the present invention, comprises the steps of feeding a coil spring wire into a pipe while rotating the coil spring wire in a first direction, and retracting the coil spring wire out of the pipe while rotating the coil spring wire in a second direction opposite to the first direction, a driving force resulting from the rotation of the coil spring wire being applied to the coil spring wire in directions of movement thereof at a position where the coil spring wire is caught by the pipe both when the coil spring wire is fed into the pipe and when the coil spring wire is retracted out of the pipe, wherein the coil spring wire is formed of a wire rod having a cross-sectional shape such that a geometrical moment of inertia with respect to a bending force acting diametrically of the coil spring wire exceeds a geometrical moment of inertia to a bending force acting longitudinally thereof.

Various experiments have been conducted in an attempt to find a coil spring wire having a small compression-extension constant, a large torsion spring constant and a small bending stress of the material, whereby the coil spring wire has both sufficient flexibility and excellent torque transmission characteristics to be able to run through a pipe having many bent positions without any possibility of deformation and/or breakage of the wire. These experiments have proved that excellent results are produced where, as noted above, the coil spring wire is formed of a wire rod having a cross-sectional shape such that the geometrical moment of inertia is greater to a bending force acting diametrically of the coil spring wire than to a bending force acting longitudinally thereof.

In the experiments, the prior art method was capable of inserting a wire into a pipe having only two bent positions whereas the method according to the present invention was capable of inserting a wire into a pipe having as many as eight bent positions.

It has also be been found that the wire does not have sufficient flexibility and excellent torque transmission characteristics at the same time where the wire rod has different diameters and different elastic coefficients.

Consequently, the present invention provides a wire inserting method which allows a coil spring wire to be fed and retracted in rotation into/out of even a pipe having many bent positions reliably, easily and speedily without deformation and/or breakage of the wire, thereby realizing a high operational efficiency.

A method of lining inside walls of a pipe, according to the present invention, comprises the steps of feeding a coil spring wire into a pipe while rotating the coil spring wire in a first direction, introducing lining body means into the pipe by the coil spring wire, supplying a lining material through a hose extending through the coil spring wire, and retracting the coil spring wire out of the pipe while rotating the coil spring wire in a second direction opposite to the first direction, thereby causing the lining body means retracted by the coil spring wire to apply the lining material to the inside walls of the pipe, a driving force resulting from the rotation of the coil spring wire being applied to the coil spring wire in directions of movement thereof at a position where the coil spring wire is caught by the pipe both when the coil spring wire is fed into the pipe and when the coil spring wire is retracted out of the pipe, wherein the coil spring wire is formed of a wire rod having a cross-sectional shape such that a geometrical moment of inertia with respect to a bending force acting diametrically of the coil spring wire exceeds a geometrical moment of inertia to a bending force acting longitudinally thereof.

The above lining method is capable of internally lining even a complicated pipe having many bent positions reliably and efficiently without deforming and/or breaking the coil spring wire.

An apparatus for inserting a wire into a pipe, according to the present invention, comprises a rotatable drum for taking up a coil spring wire, a guide for guiding the coil spring wire drawn from the rotatable drum, push-pull means for applying external forces to the coil spring wire for feeding the coil spring wire into the pipe and retracting the coil spring wire out of the pipe, and drive means for rotating the guide and/or the drum, wherein the drum and the guide are formed separately and are rotatable independently of each other, which rotation results in rotation of the coil spring wire.

The above apparatus allows the wire in rotation to be fed into and drawn out of even a complicated pipe having many bent positions reliably, easily and speedily without deformation and/or breakage of the wire, thereby realizing a high operational efficiency.

Other features and advantages of the present invention will be apparent from the following description.

BRIEF DESCRIPTION OF THE DRAWINGS

The drawings illustrate embodiments of the present invention, in which.

DETAILED DESCRIPTION OF THE PREFERRED EMBODIMENT

The present invention will be described further as embodied into a method of inserting a wire into a pipe, a method of lining inside walls of a pipe and an apparatus for inserting a wire into a pipe with reference to the drawings.

The method of lining inside walls of a pipe will be described first, which is executed while inserting a wire into the pipe.

Figures 1A, 1B:
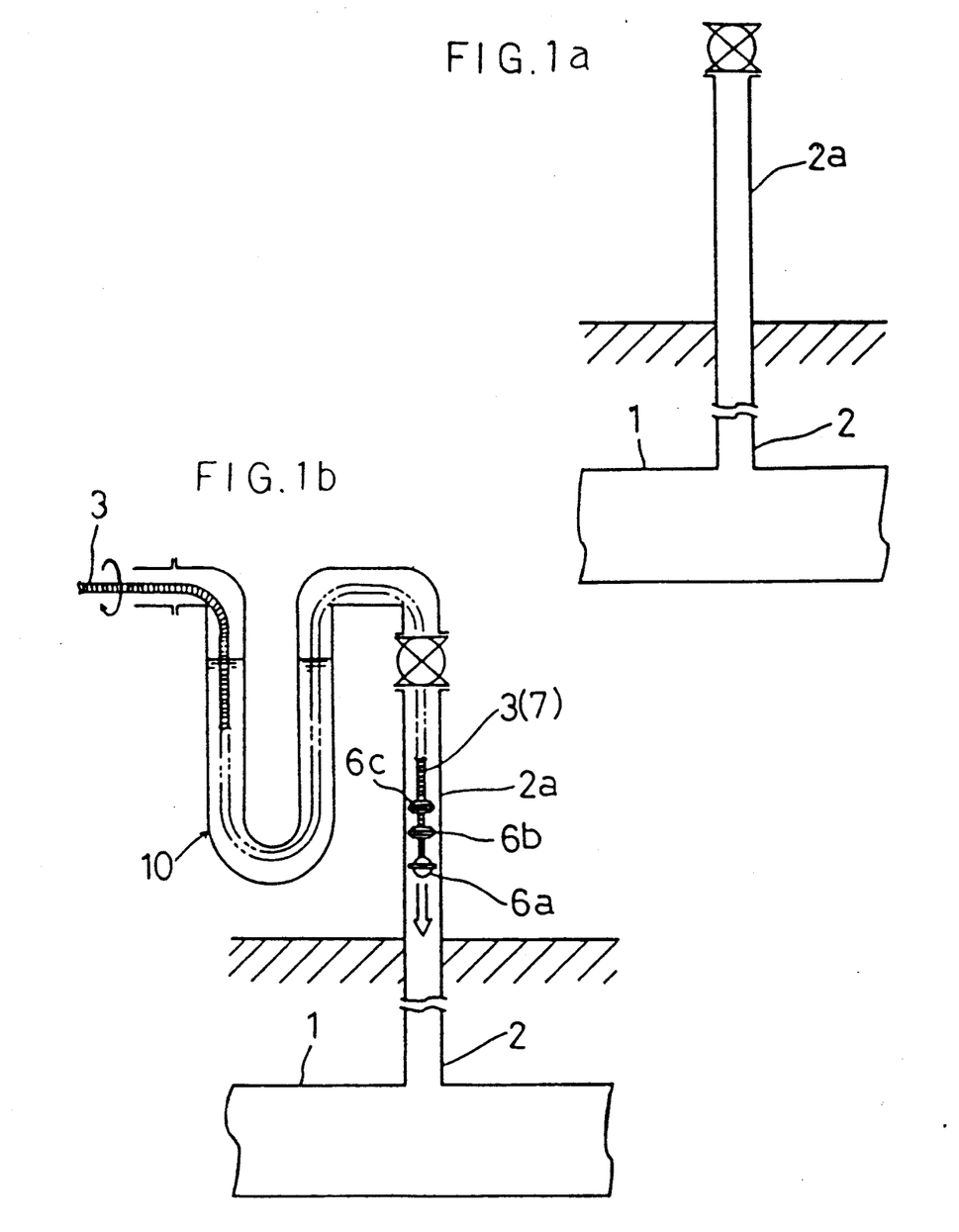
FIGS. 1(a) through 1(d) are conceptual views of the sequence for executing a method of inserting a wire into a pipe according to the present invention.

Referring to FIG. 1(a), a main pipe 1 installed underground for supplying town gas has a service pipe 2 extending above the ground as at 2a, and this portion 2a is opened. That is, the service pipe 2 acting as a metering pipe is opened by removing a consumer gas meter and a meter cock therefrom.

Figure 2:
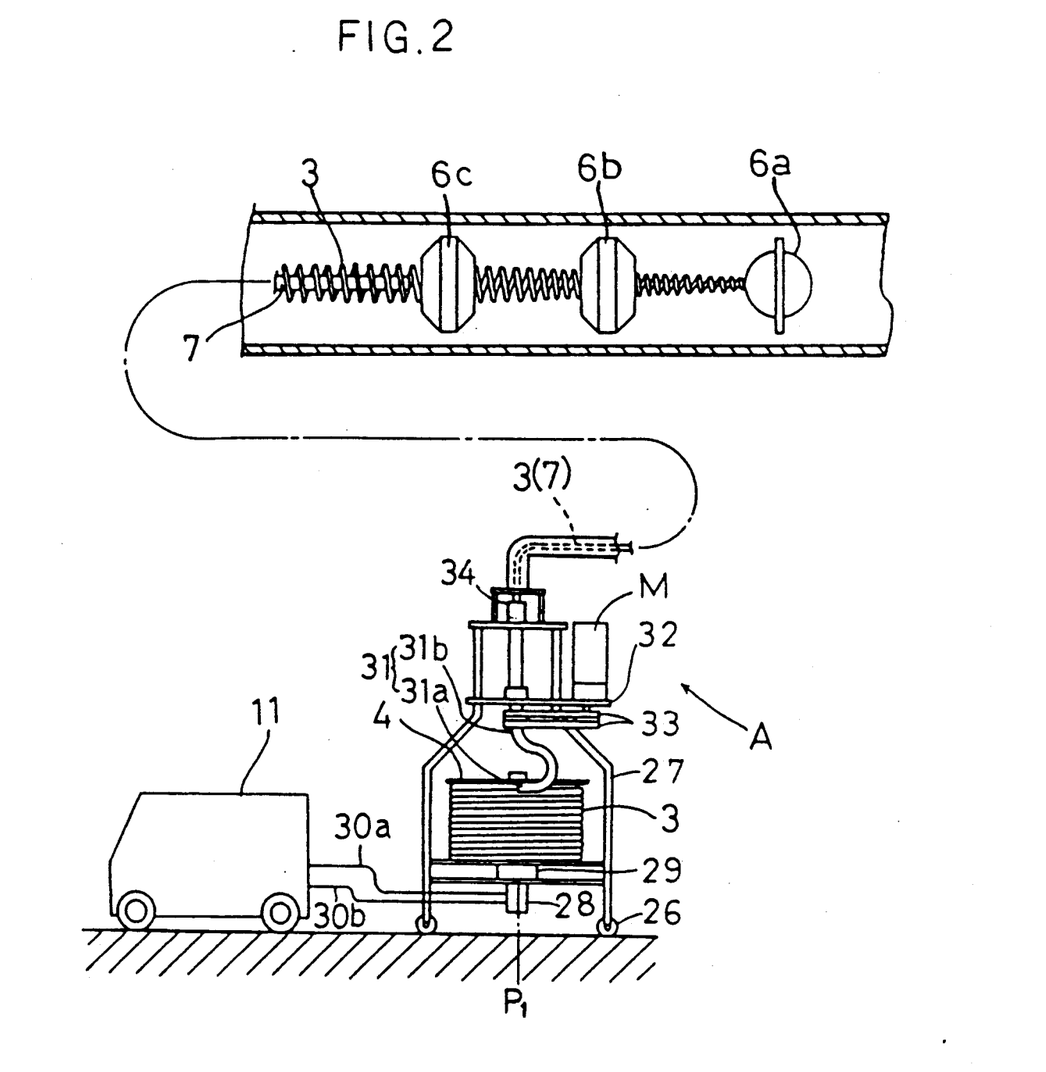
FIG. 2 is a schematic view of a wire inserting apparatus used in the method of inserting a wire into a pipe and a method of lining inside walls of a pipe according to the present invention.

Referring to FIG. 2, a wire inserting apparatus A is brought to the site of operation, which comprises a wire 3 in the form of a coil spring having three lining bodies 6a, 6b and 6c attached to a forward end thereof, a hose 7 extending through the coil spring wire 3 for injecting a liquid lining material, and a storage drum 4 for feeding and taking up the wire 3 and hose 7 while rotating the wire 3 and hose 7. The hose 7 is connected to a lining material supplying unit 11. This wire inserting apparatus A will be described in greater detail later.

As shown in FIG. 1(b), a water sealing pipe 10 is connected to the portion 2a of the service pipe 2 above the ground. The lining bodies 6a, 6b and 6c of the wire inserting apparatus A are introduced into the service pipe 2 with the coil spring wire 3 and hose 7 passed through the water sealing pipe 10. The wire 3 is pushed further while being rotated, to advance the lining bodies 6a, 6b and 6c in rotation to the vicinity of the end of the service pipe 2 connected to the main pipe 1.

Figure 3:
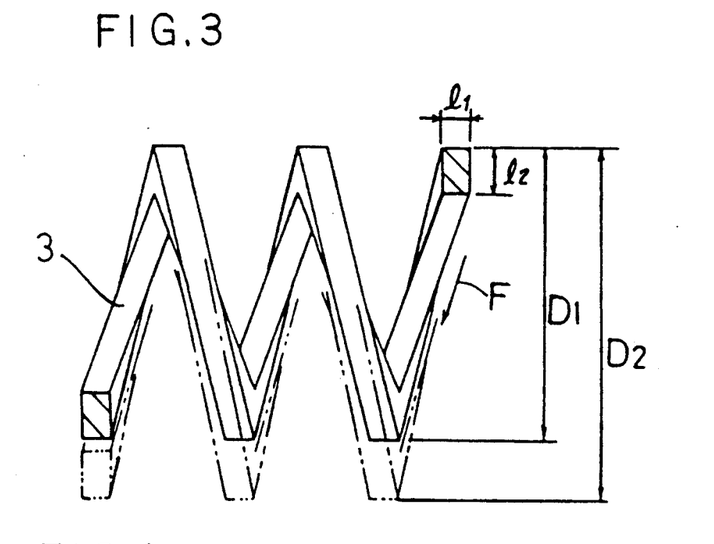
FIG. 3 is an explanatory view of a wire in the form of a coil spring used in the present invention.

At this time, as shown in FIG. 3, an external force F resulting from the rotational resistance of the lining bodies 6a, 6b and 6c and the coil spring wire 3 rotates the wire 3 in an unwinding direction to increase the coil diameter of the wire 3 from D1 to D2. This rotation imparts a driving force to the coil spring wire 3 in the feeding direction thereof at positions where the wire 3 is caught by the service pipe 2.

The coil spring wire 3 is formed of a wire rod having a rectangular cross section, with dimension l1 longitudinally of the coil spring wire 3 and dimension l2 diametrically thereof being in the relationship;

$$l_1 < l_2 < 3l_1.$$

This configuration allows the coil spring wire 3 to pass smoothly through bent positions of the service pipe 2, and eliminates possibilities of the wire 3 becoming deformed and/or broken.

Figures 1C, 1D:
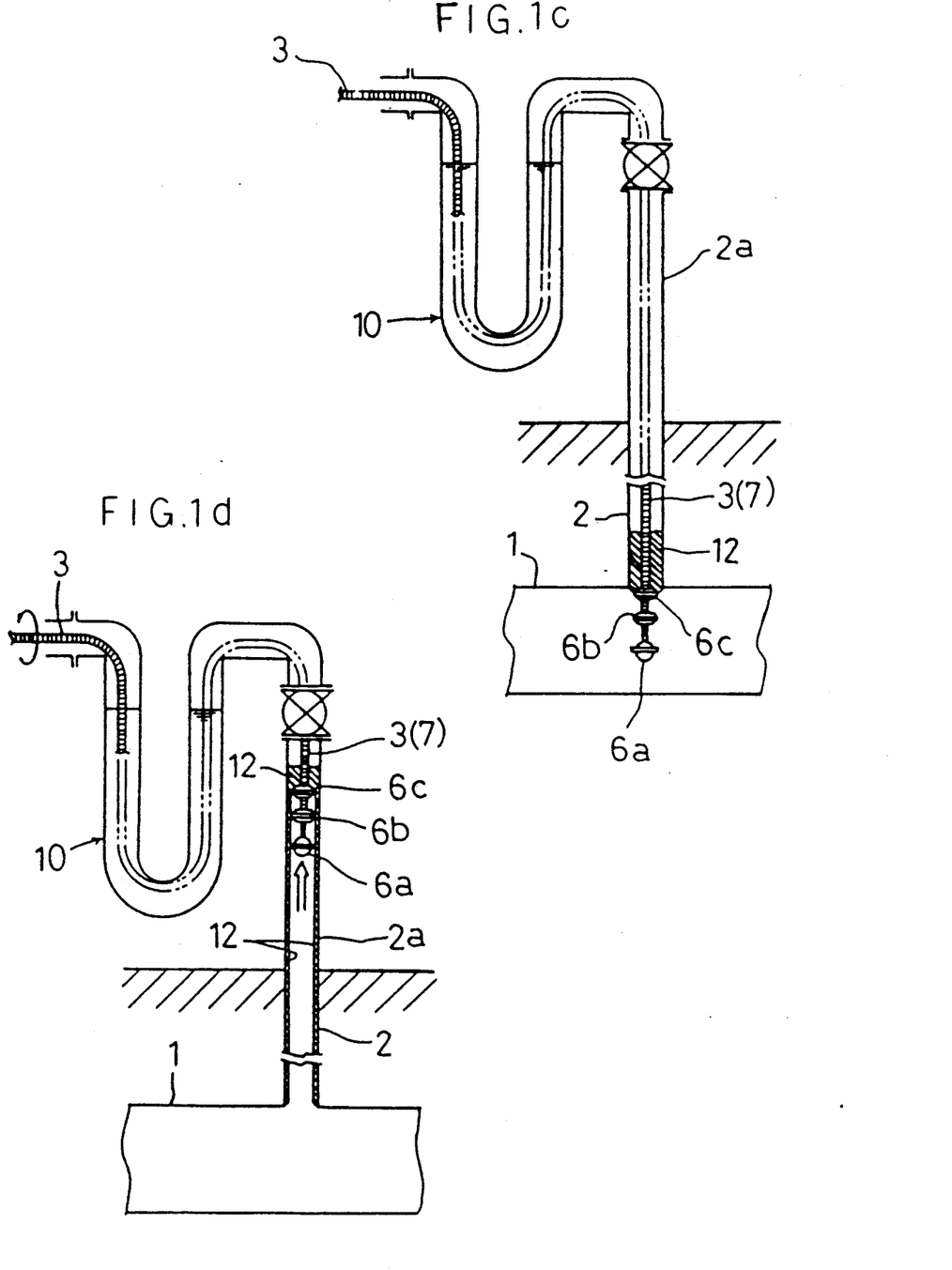

Thereafter, as shown in FIG. 1(c), the coil spring wire 3 and lining bodies 6a, 6b and 6c are brought to a standstill. In this state the liquid lining material is injected in an appropriate amount through the hose 7 into the service pipe 2 as at 12.

Then, as shown in FIG. 1(d), the coil spring wire 3 and lining bodies 6a, 6b and 6c are pulled outward while rotating the coil spring wire 3 and lining bodies 6a, 6b and 6c in the opposite direction to when the coil spring wire 3 and lining bodies 6a, 6b and 6c are fed into the service pipe 2. Meanwhile, the supply of lining material 12 is continued through the hose 7, for the lining bodies 6a, 6b and 6c in the outwardly retracting movement to force aside and distribute the lining material 12 over inside walls of the service pipe 2.

At this time, the driving force resulting from the rotation of the coil spring wire 3 acts on the wire 3 in the direction of its retraction at positions where the wire 3 contacts or engages the service pipe 2.

The service pipe 2 is thus internally lined over an entire length thereof.

Thereafter the water sealing pipe 10 is detached from the service pipe 2 to reinstate the service pipe 2 for resuming town gas supply.

The external force for rotating the coil spring wire 3 may be produced by the following methods, for example:

(1) By rotating the storage drum 4 in opposite directions, (2) By rotating the coil spring wire 3 in opposite directions as held by a chuck or the like, or (3) By rotating, in opposite directions, a guide provided for guiding the coil spring wire 3 as the wire 3 is drawn from the storage drum 4.

Such an external force may, of course, be produced by various other methods.

On the other hand, external forces applied for advancing and retracting the coil spring wire 3 may also be produced by various methods, such as by rotating, in opposite directions, rollers or caterpillars in pressure contact with the wire 3.

Figure 4:
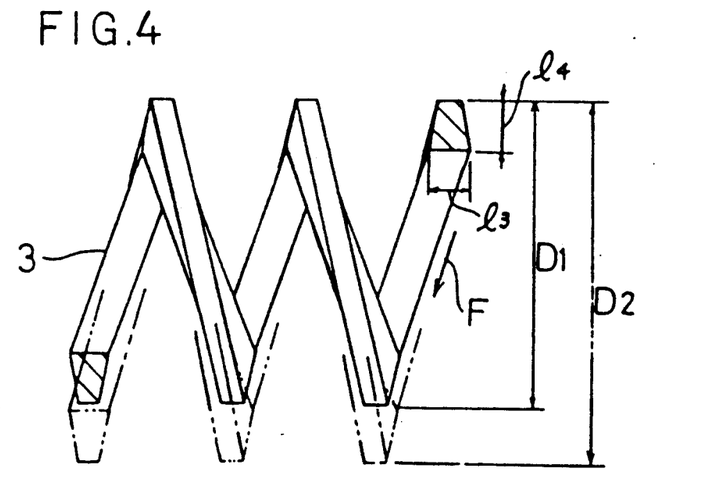
FIG. 4 is an explanatory view of another coil spring wire used in the present invention.

The wire rod forming the coil spring wire 3 generally has a rectangular or trapezoidal cross section. However, this wire rod may have any other cross-sectional shapes as long as the geometrical moment of inertia with respect to a bending force acting diametrically of the coil spring wire 3 exceeds the geometrical moment of inertia to a bending force acting longitudinally thereof. Where the sectional shape is trapezoidal as shown in FIG. 4, however, it is desirable that its base having dimension 13 be located inwardly and in the following relationship with height 14:

13<14<3l3.

The wire inserting apparatus A used in the present invention has a construction as shown in overall outline in FIG. 2.

This apparatus includes a stand 27 having lockable casters 26. The stand 27 carries the storage drum 4 which is rotatable on a vertical axis P1 through a tubular shaft 28 and a bearing 29 to take up the coil spring wire 3 in one row.

The tubular shaft 28 contains a rotary joint having a lower end connected to the lining material supplying unit 11 through a resin supplying hose 30a and a curing agent supplying hose 30b. The resin and the curing agent are mixed by a mixer, such as a static mixer, mounted in the storage drum 4.

The apparatus A further includes a guide pipe 31 for guiding the coil spring wire 3 drawn from the storage drum 4. The guide pipe 31 has a twisted configuration, with a first end 31a thereof disposed adjacent a top position of a wire takeup peripheral surface of the drum 4, and a second end 31b substantially coaxial with the vertical axis P1 on which the drum 4 is rotatable. In this example, the drum 4 and the guide 31 are formed separately and are rotatable or revolvable independently of each other. This construction allows the coil spring wire 3 to be fed out and taken up reliably and without trouble.

The stand 27 further supports a deck 32 which in turn supports an electric motor M acting as a driving device. The electric motor M rotates a pulley connected thereto, which rotates, through a transmission belt 33, a pulley attached to the guide pipe 31. Through this transmission system the electric motor M drives the guide pipe 31 at an appropriate rate, for example, up to 200 rpm.

Upwardly of the deck 32 is a push-pull device 34 mounted substantially on the axis $P^1$ of rotation of the drum 4, to apply the external forces to the coil spring wire 3 for feeding the wire 3 into the pipe 2 and drawing the wire 3 out of the pipe 2. The push-pull device 34 is fixed in position and defines an internal thread for receiving the coil spring wire 3. When starting to feed the wire 3 into the pipe 2 or draw the wire 3 out of the pipe 2, the rotation of the guide pipe 31 imparts a driving force to the wire 3.

The material for coil spring wire 3 may suitably be selected, for example, from materials having properties similar to those of hard drawn steel wire and piano wire. The sectional diameter, inside diameter, outside diameter, and pitch of the coil spring wire 3 may also be selected as appropriate having regard to pipe sizes and pipe bending.

Various types of lining body, pipe interior cleaning device or survey instrument may be attached to the forward end of the coil spring wire 3.

The method of running a wire through a pipe according to the present invention may be used to measure pipe lengths as well.

The lining bodies may be varied in many ways with respect to the material, shape, structure, number and size thereof. The lining material may comprise a two-component type, air curing type, wet moisture curing type or various other types.

The main pipe 1 and service pipe 2 may be natural gas pipes, or city water pipes, for example. The present invention is thus applicable to various types of pipe. The pipe 2 may be concealed in a structure or may be exposed therefrom.

Figure 5:
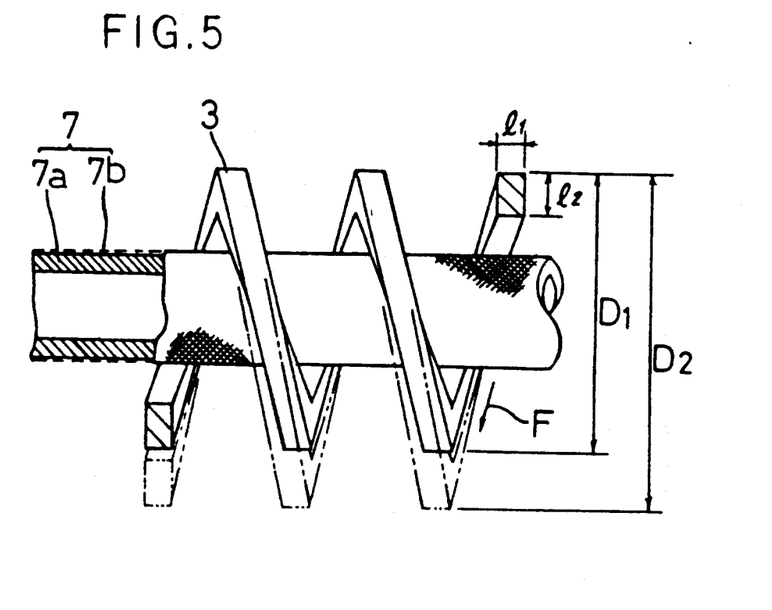
FIG. 5 is an explanatory view of a further coil spring wire used in the present invention.

As shown in FIG. 5, the hose 7 has a two layer construction comprising an inner tube 7a formed of a material having a hardness not exceeding JIS(A)Hs80°, such as non-rigid PVC, and an outer braid 7b formed of a material having an elongation percentage not less than 10%, such as staple vinylon. This construction does not affect flexibility of the coil spring wire 3, prevents kinks of the hose 7 due to the rotation of coil spring wire 3, and allows the lining material to be supplied under high pressure through the hose 7. The ratio between the inside diameter and wall thickness of the hose 7 should preferably be 1.5–7.0 to one.

Figure 6:
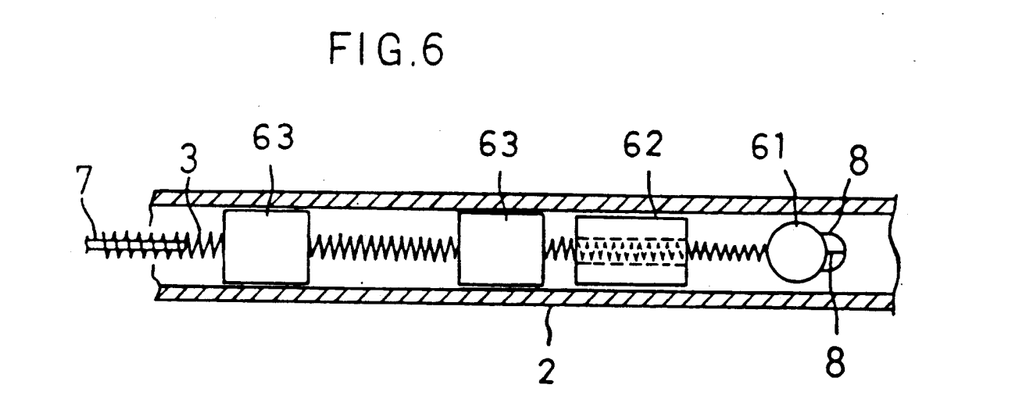
FIG. 6 is an explanatory view of lining bodies used in the method of lining inside walls of a pipe according to the present invention.
Figure 7:
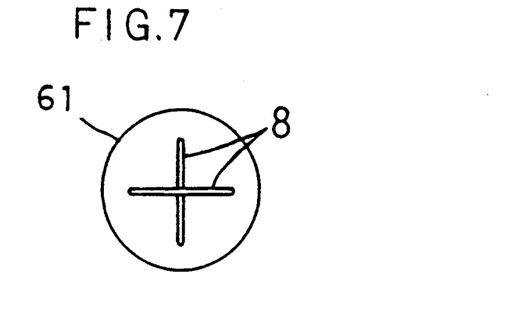
FIG. 7 is a front view of a guiding pig.

The lining bodies may be constructed as shown in FIG. 6. Specifically, a spherical guiding pig 61 is attached to the forward end of the coil spring wire 3, and the guiding pig 61 is followed by a lining finishing body 62 having a larger diameter than the guiding pig 61. The finishing body 62 is followed by two preliminary lining bodies 63. As shown in FIGS. 6 and 7, two curved metal wires 8, substantially cruciform in front view, project from a forward end of the spherical guide 61, each secured at opposite ends thereof to the forward end of the guiding pig 61, for enabling the guiding 61 to pass smoothly and reliably through bent positions of the pipe.

Figure 8A:
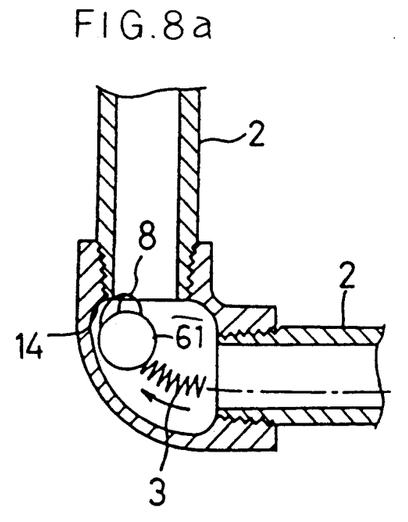
FIGS. 8(a) and 8(b) are explanatory views showing movement of a spherical guiding pig through a bent portion of a pipe.
Figure 8B:
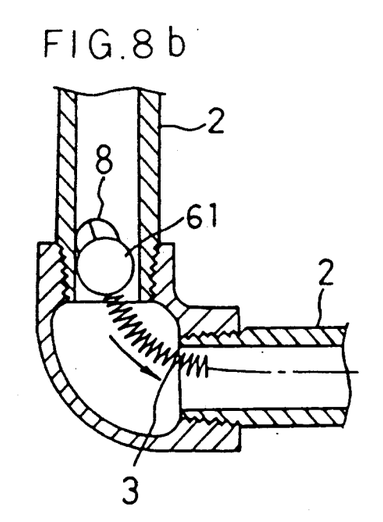

When the coil spring wire 3 is advanced through the pipe 2 as shown in FIG. 8(a), the metal wires 8 mount a stepped portion 14 and lead the spherical guiding pig 61 to pass smoothly without colliding with the stepped portion 14. When the coil spring wire 3 is drawn out of the pipe 2 as shown in FIG. 8(b), the metal wires 8 contact the pipe 2, which determines a direction in which the coil spring wire 3 pulls the spherical guiding pig 61, whereby the spherical guiding pig 61 passes smoothly through the bent position of the pipe 2 without becoming caught therein.

This simple construction having a plurality of metal wires attached to the spherical guiding pig 61, thus, assures excellent wire inserting performance at bent positions of the pipe.

The metal wires 8 may each comprise a stranded or solid wire of iron, brass or stainless steel, or a wire of any other suitable metal. Three or more metal wires 8 may be provided instead of two. Further, the metal wires 8 may be bent into a semicircular or other suitable shape.

Figure 9A:
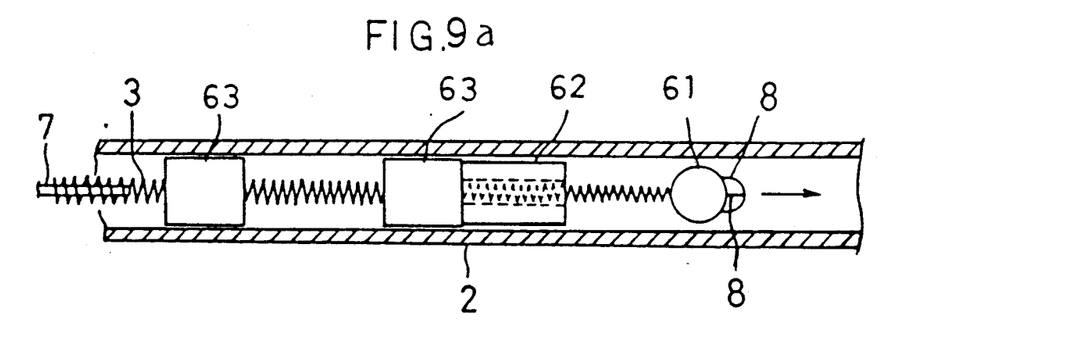
FIGS. 9(a) and 9(b) are explanatory views showing functions of the lining bodies.
Figure 9B:
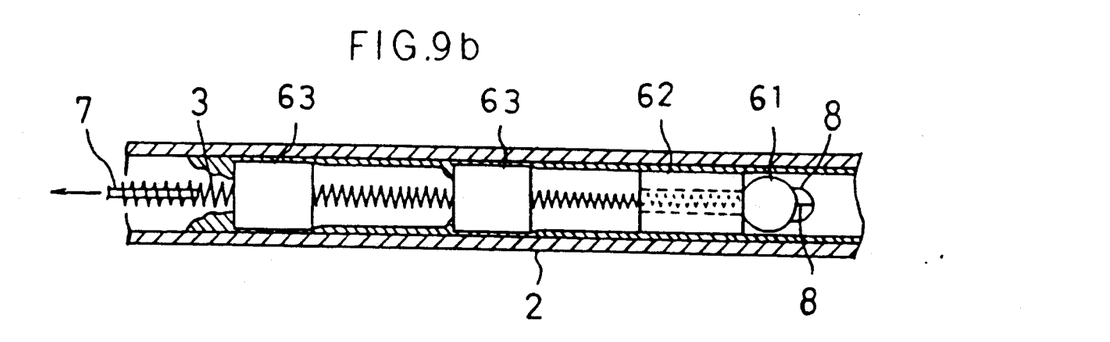

Referring to FIGS. 6 and 9, the two preliminary lining bodies 63 are secured to the coil spring wire 3, while the finishing body 62 is mounted on the wire 3 to be slidable between the spherical guiding pig 61 and one of the preliminary lining bodies 63 attached at fixed positions longitudinally of the wire 3.

When the coil spring wire 3 is fed into the pipe, the finishing body 62 approaches the preliminary lining body 63 as shown in FIG. 9(a). The finishing body 62 in this position allows the spherical guide 61 to pass through a bent position of the pipe with ease owing to the flexion of the wire 3 occurring between the finishing body 62 and the spherical guiding pig 61.

More particularly, the coil spring wire 3 in this state has a sufficient length between the spherical and finishing body 62 to facilitate its flexion. Thus, by pushing the coil spring wire 3 into the pipe, the finishing body 62 and the preliminary lining bodies 63 may be allowed to pass smoothly and reliably through the bent position of the pipe thanks to the guiding action of the spherical guiding pig 61.

When pulling the coil spring wire 3 out of the pipe, the finishing body 62 approaches the spherical guiding pig 61 to hold the guide 61 in position out of contact with the lining material applied to the pipe. Thereby an excellent lining treatment is carried out on the pipe interior.

More particularly, when the lining material 12 is applied to the inside walls of pipe 2 by the preliminary lining bodies 63 and finishing body 62 pulled by the coil spring wire 3, the finishing body 62 slides to the vicinity of the spherical guiding pig 61. As a result, the guiding pig 61 is positionally restricted to the center of the pipe 2 by the action of the finishing body 62 which has a larger diameter than the guiding body 61. There is very little possibility of the spherical guiding 61 moving into contact with the lining material applied by the finishing body 62 to the inside walls of the pipe. Thus the inside walls of the pipe are lined in an excellent manner with hardly any detrimental effect imparted by the spherical guide 61.

Figures 10, 11:
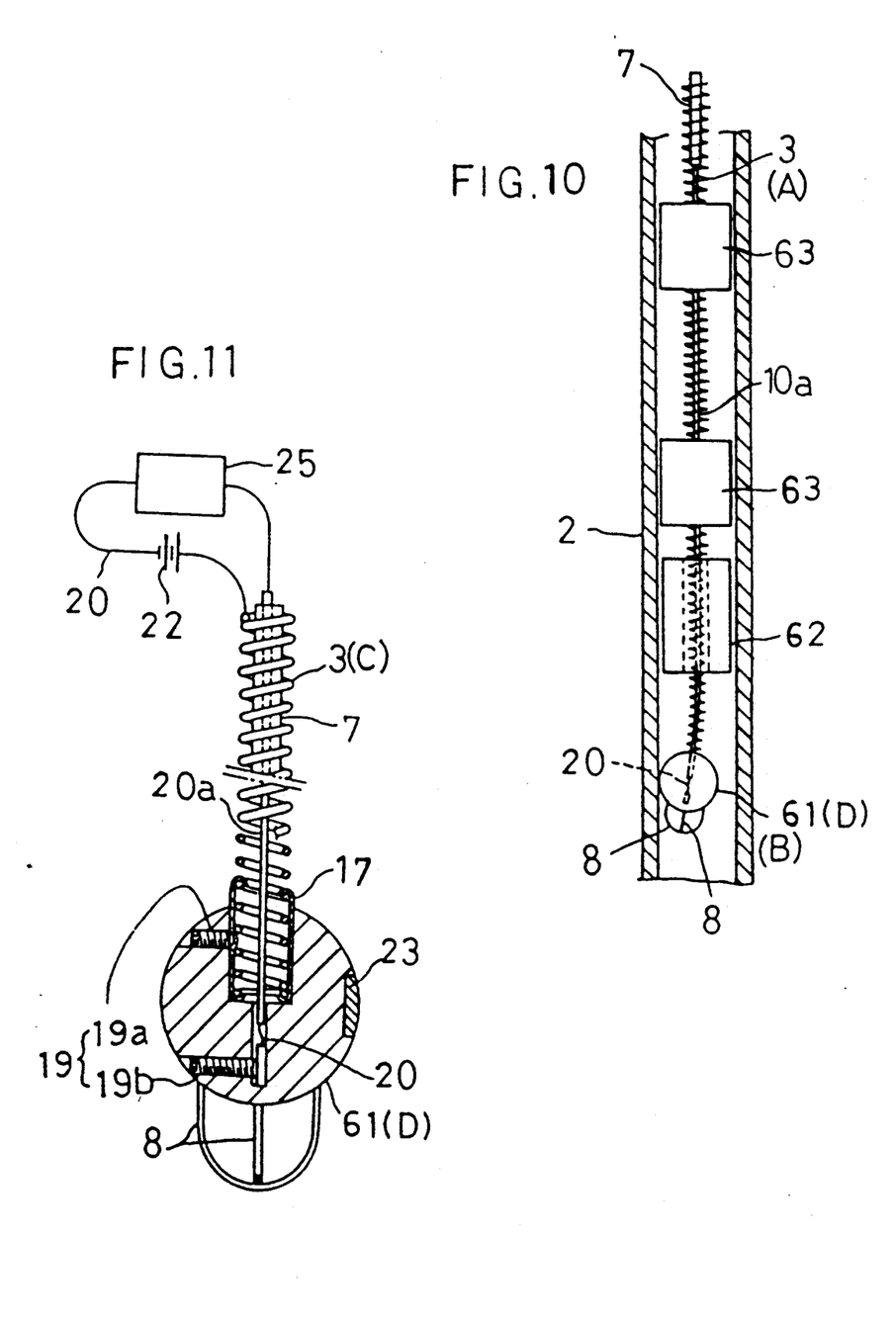
FIG. 10 is an explanatory view of a guiding pig incorporating a detecting device.
FIG. 11 is an explanatory view of a principal portion of the guiding pig shown in FIG. 10, FIGS. 12(a) through 12(c) are explanatory view of the guiding pig of FIG. 10 in use.

Means may be provided for detecting arrival of the spherical guiding pig 61 at the main pipe 1. As shown in FIGS. 10 and 11, a heat shrinkable tubing 17 formed of an insulating material is fitted on the forward end of the coil spring wire 3 formed of a conductive material, to electrically insulate the spherical guide 61 formed of a conductive material such as brass. The spherical guiding pig 61 is connected to the coil spring wire 3 by a screw 19. An electric wire 20 covered by an insulating sleeve 20a extends through the hose 7, and is connected to the spherical guiding pig 61 by a screw 19. The coil spring wire 3 and electric wire 20 are connected to a DC source 22. One of the wires 3 and 20 acts as a positive electrode C and the other as a negative electrode D for contacting the service pipe 2 through which town gas is supplied. It will be understood that the DC source 22 may replaced with an AC source.

The spherical guiding pig 61 includes a magnet 23 for causing the guiding pig 61 positively to contact the service pipe 2 where the service pipe 2 extends vertically.

Thus, when feeding into the town gas service pipe 2 formed of a metal, the coil spring wire 3 and the spherical guide 61 acting as electrodes C and D are brought into contact with the service pipe 2. As a result, an electric circuit is formed including the service pipe 2 and electrodes C and D.

The electric circuit thus formed further includes a detecting device 25 for checking whether the spherical guiding pig 61 acting as electrode C is contacting the service pipe 2 or not. When the detecting device is de-electrified for a predetermined time of about 3 seconds, the arrival of the spherical guiding pig 61 at the main pipe 1 is notified by a buzzer and/or a lamp. Thus the device for internally lining the pipe 2 also has a pipe length measuring function.

Figure 12A:
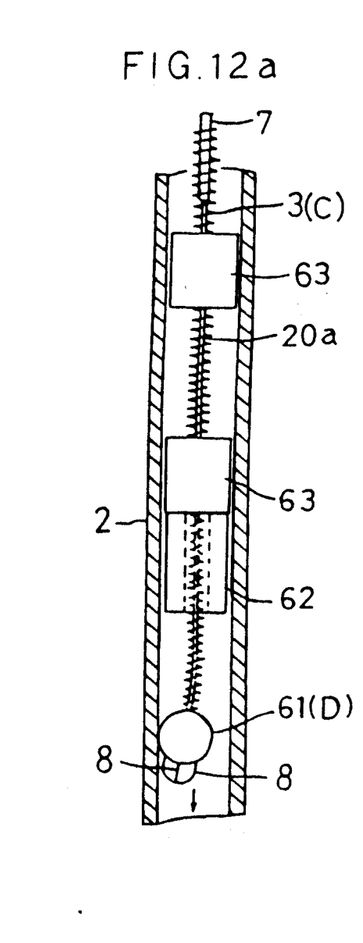
Figure 12B:
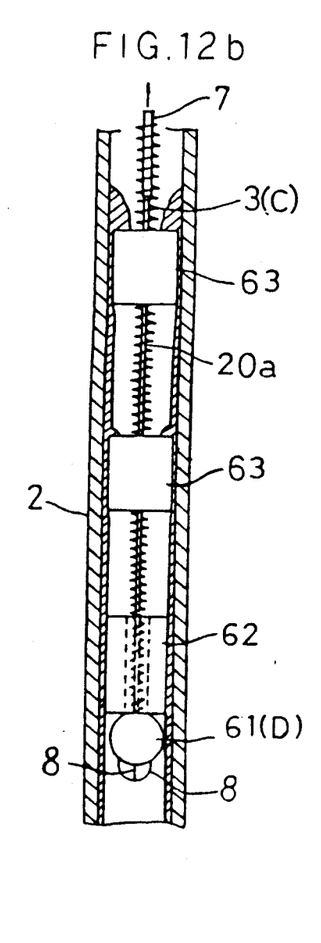
Figure 12C:
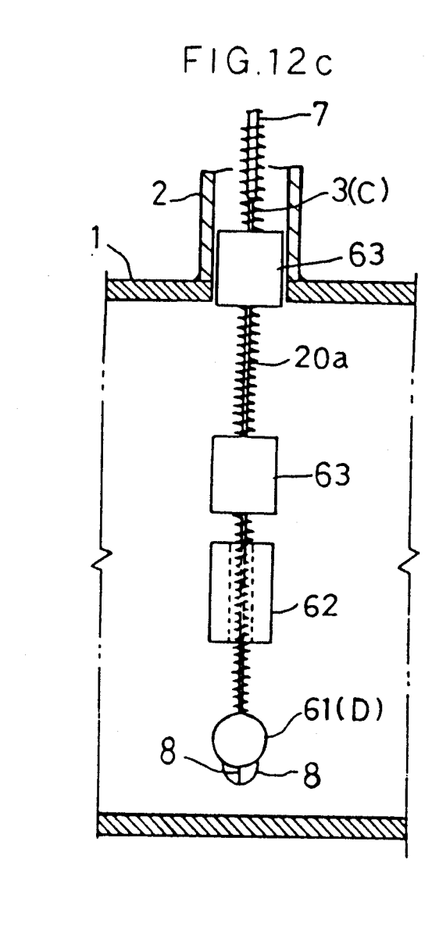

Specifically, when the spherical guide 61 reaches the main pipe 1 having a larger diameter after advancing through the service pipe 2 having a small diameter, the spherical guiding pig 61 is out of contact with the pipes 1 and 2 as shown in FIG. 12(c). This position is detected by the detecting device 25, whereupon the coil spring wire feeding into the pipe is stopped and, if necessary, the wire 3 is drawn outward by a appropriate length. Thereafter, injection of the lining material through the hose 7 is commenced, to line the service pipe 2 over an entire length thereof in a reliable manner without allowing the lining material to flow into the main pipe 1.

The means for providing insulation between the spherical guiding pig 61 and the coil spring wire 3 may be varied in many ways, which are termed herein as an insulator 24.

The specific construction and material of the spherical guiding pig 61 may be varied as appropriate. For example, the guiding pig 61 may be constructed without the metal wires 8.

The finishing body 62 and preliminary lining bodies 63 may be varied as appropriate with respect to their shape, material, structure, number, size and so on. These lining bodies 62 and 63 may not be rotatable with the coil spring wire 3. It will serve the purpose if the lining bodies 62 and 63 are disposed adjacent the spherical guiding pig 61.

The electric wire 20 may be varied as desired with respect to its connection and arrangement. For example, the electric wire 20 may extend through a space between the coil spring wire 3 and the hose 7.

The detecting device 25 may employ various specific constructions and detecting modes. For example, an ordinary ammeter or electric resistance measuring device may be used therefor.

Figure 13:
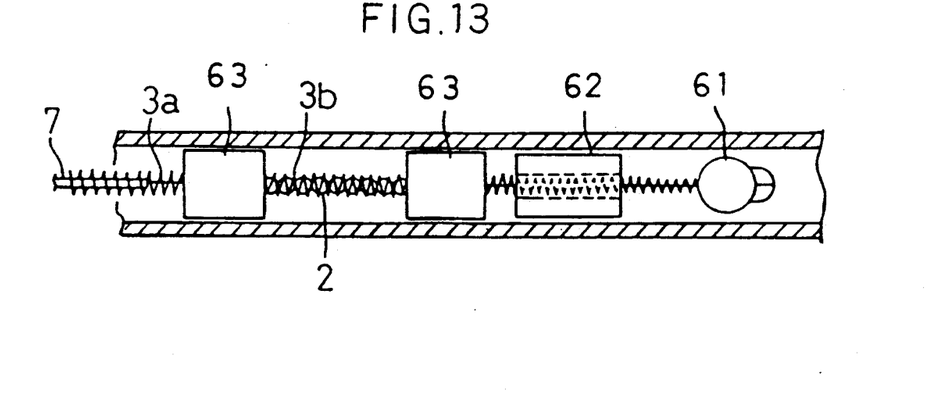
FIG. 13 is an explanatory view of a further guiding pig incorporating the detecting device used in the present invention.
Figure 14:
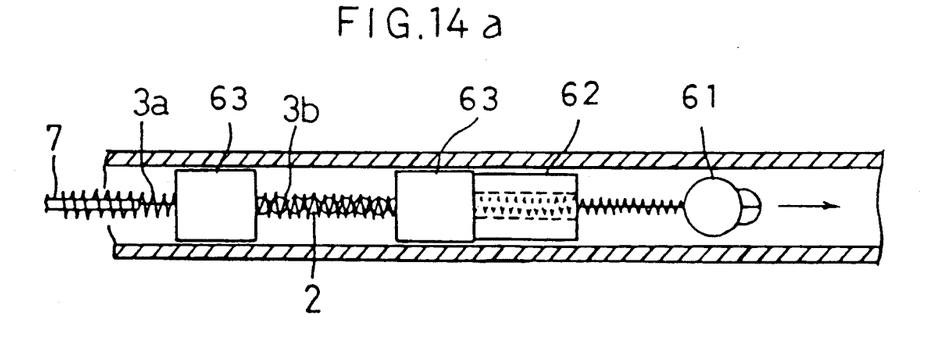
FIGS. 14(a) and 14(b) are explanatory view of the guiding of FIG. 13 used in a lining operation.
Figure 15:
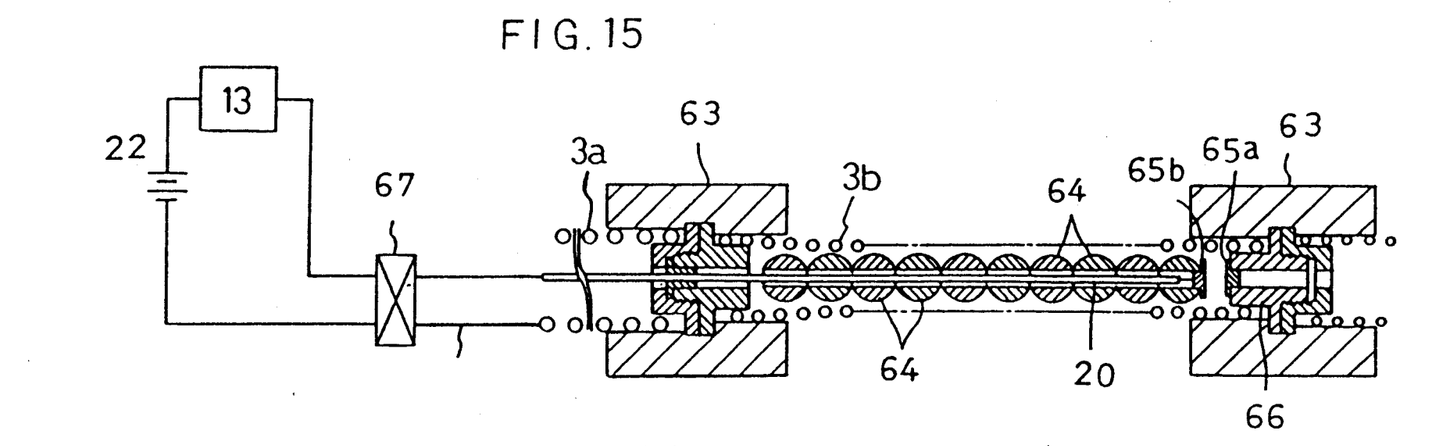
FIG. 15 is an enlarged view of a principal portion of the detecting device shown in FIG. 13.

Further, the following construction may be adopted to detect trouble at the forward end of the wire in advance for positively preventing the forward end of the wire from becoming broken:

As shown in FIGS. 13 through 15, this construction has a coil spring wire 3 including a main portion 3a and a forward end portion 3b formed of thinner, and more flexible wires than the main portion 3a. The forward end portion 3b decreases in thickness by stages to increase in flexibility progressively toward its extreme end. Further, the forward end portion 3b of the wire is coiled with a pitch exceeding its thickness. Thus, when the coil spring wire 3 is advanced through the pipe, the flexibility of the forward end portion 3b facilitates passage of the spherical guiding pig 61 through bent positions of the pipe. If the spherical guiding pig 61 should become caught by the pipe, the forward end portion 3b of the wire would flex under compression.

A plurality of perforated balls 64 formed of an insulating material such as resin, rubber or wood are arranged close to one another through the part of the forward end portion 3b of the coil spring wire 3 between the two lining bodies 63. A first electric contact 65a is attached, and electrically connected, to a stationary element 66 mounted in one of the lining bodies 63, while a second electric contact 65b is attached to the ball 64 adjacent this lining body 63. The stationary element 66 and the ball 64 retain the first and second electric contacts 65a and 65b substantially at the center with respect to the coil diameter of the forward end portion 3b even when the latter flexes.

In other words, the two electric contacts 65a and 65b are opposed to each other so that, when the spherical guiding pig 61 becomes caught by the pipe to be unable to advance further in the course of coil spring wire feeding through the pipe, the flexion under compression of the forward end portion 3b of the wire presses the contacts 65a and 65b upon each other.

Further, when the forward end portion 3b flexes, an outer part of the forward end portion 3b extends and an inner part thereof shrinks. The forward end portion 3b of the wire remains out of contact with the first and second electric contacts 65a and 65b disposed substantially centrally of the coil diameter of the forward end portion 3b.

An electric wire 20 is connected to a proximal end of the main wire portion 3a which is electrically connectable through the forward end portion 3b and stationary element 65a to the stationary element 66. Another electric wire 20 covered by an insulating sleeve is connected also to the second electric contact 65b, and extends through the inside space of the coil spring wire 3 and out of the proximal end thereof. The two electric wires 20 are connected to a rotary electric contact 67 which in turn is connected to a detector 25. The detector 25 thus checks whether the first and second electric contacts 65a and 65b are in contact or not, namely whether the spherical guiding pig 61 is caught by the pipe or not.

The device for advancing and retracting the coil spring wire 3 in rotation into and out of the pipe may be varied as appropriate. For example, the coil spring wire 3 may be rotated in opposite directions or in one direction by rotation of the storage drum 4, a chuck and the like, and may be advanced and retracted by a female screw, rollers or caterpillars in engagement with the coil spring wire 3.

The device for facilitating flexion of the forward end portion 3b of the wire compared with the main wire portion 3a may be varied as appropriate. For example, the two wire portions 3a and 3b may be formed of different materials, or the forward end portion 3b may be formed uniform over an entire length thereof.

The device for detecting the flexion under compression of the forward end portion 3b of the wire may be varied as appropriate. For example, this detecting device may comprise a proximity switch capable of distance measurement, a proximity switch which turns on when a distance to an object measured is below a reference distance, or a range finder for measuring distances by means of laser or ultrasonic wave. These devices are collectively termed herein as sensors 65a and 65b.

The sensors 65a and 65b may be disposed at various positions longitudinally of the forward end portion 3b of the wire, for example, between the spherical guiding pig 61 and the lining body 62 or between adjacent balls 64.

The device for retaining the sensors 65a and 65b substantially at the center of the coil diameter of the forward end portion 3b of the wire, may comprise a rubber tubing, a perforated elastomeric bar or the like. These devices are collectively termed herein as sensor retaining means 64 and 66.

The detector 25 connected to the wire or wires 20 which transmit information from the sensors 65a and 65b may suitably be selected according to the type of sensors 65a and 65b, and may be connected at the site of operation.

Various types of lining body, pipe interior cleaning device or survey instrument may be attached to the forward end of the coil spring wire 3.

What is claimed is:

1. An apparatus for running a coil of wire through a pipe, comprising:
   a feeding mechanism for feeding a coil of spring wire into a pipe and for retracting the coil out of the pipe while rotating the coil;
   a driving mechanism for applying a driving force resulting from the rotation of the coil to the coil in directions of movement thereof at a position where the coil is caught by the pipe both when the coil is fed into the pipe and when the coil is retracted out of the pipe; and
   wherein said coil is formed of a spring wire material having a rectangular or trapezoidal cross-sectional shape such that it has a dimension diametrically of the coil designated as $l_2$ which exceeds its dimension longitudinally designated as $l_1$ and in which the dimensions $l_1$ and $l_2$ are in the following relationship: $l_1 < l_2 < 3l_1$, whereby the coil spring has a geometrical moment of inertia with respect to a bending force acting diametrically of the coil which exceeds a geometrical moment of inertia, with respect to a bending force acting longitudinally thereof so that the coil spring has sufficient flexibility to run through bends in the pipe without breaking or deforming.

2. The apparatus according to claim 1, further comprising:
   a rotatable drum for taking up the coil of spring wire;

a guide for guiding the coil drawn from the rotatable drum;

push-pull means for applying external forces to the coil for feeding the coil into the pipe and retracting the coil out of the pipe; and drive means for rotating the guide and/or the drum; wherein the drum and the guide are formed separately and are rotatable independently of each other, which rotation results in rotation of the coil.

3. The apparatus as claimed in claim 2 wherein the guide has a twisted configuration, with a first end thereof disposed adjacent a wire takeup peripheral surface of the drum, and a second end substantially coaxial with an axis of rotation of the drum.

4. The apparatus as claimed in claim 2 comprising drive means rotating the guide about a second end thereof and substantially on the axis of rotation of the drum.

5. The apparatus as claimed in claim 2 comprising drive means rotating the drum on the axis of rotation thereof.

6. The apparatus for running a wire through a pipe as claimed in claim 1, wherein said feeding mechanism includes a spool for winding said coil of spring wire and a guide member for guiding said coil unwound from said spool and said driving mechanism includes a leading end guide that rotates in unison with said coil and that is placed at a leading end of said coil.

* * * * *

UNITED STATES PATENT AND TRADEMARK OFFICE
CERTIFICATE OF CORRECTION

PATENT NO.    : 5,181,668
DATED         : January 26, 1993
INVENTOR(S)   : TOSHINORI TSUJI ET AL It is certified that error appears in the above-indentified patent and that said Letters Patent is hereby corrected as shown below:

Column 6, line 46, delete "wet".

Column 7, line 7, after "guiding", (second occurrence), insert --pig--.

Column 7, line 54, delete "guide", insert --guiding pig--.

Column 7, line 66, after "guiding", insert --pig--.

Column 8, line 40, delete "guide", insert --guiding pig--.

Signed and Sealed this

Fourth Day of October, 1994

Attest:

BRUCE LEHMAN

Attesting Officer

Commissioner of Patents and Trademarks